United States Patent Office 3,328,225
Patented June 27, 1967

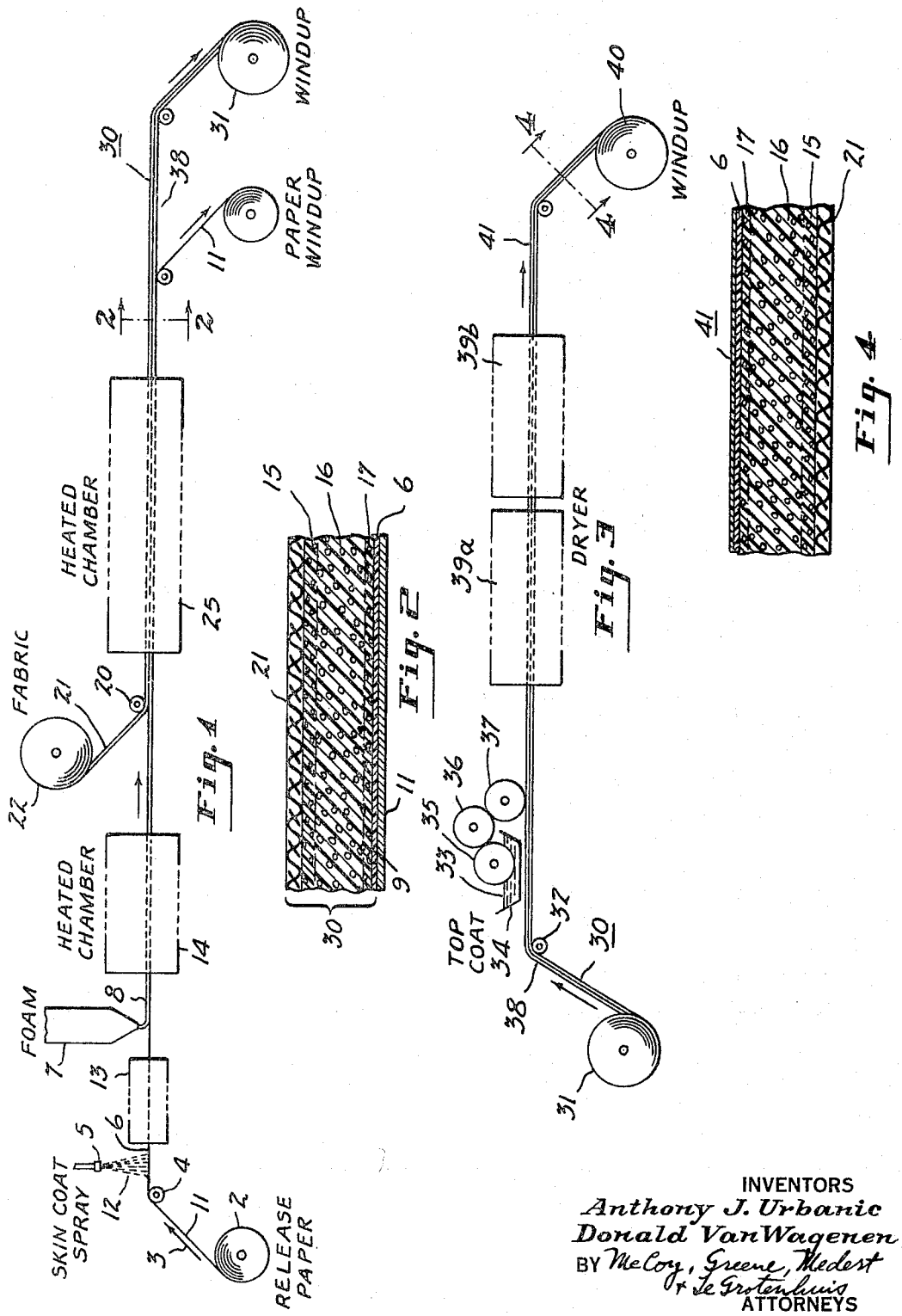

3,328,225
DRY-CLEANABLE EXPANDED PLASTIC LAMINATES AND METHODS OF MAKING THE SAME
Anthony J. Urbanic, Akron, and Donald Van Wagenen, Alliance, Ohio, assignors to The General Tire & Rubber Company, Akron, Ohio, a corporation of Ohio
Filed Jan. 20, 1964, Ser. No. 338,825
16 Claims. (Cl. 161—89)

ABSTRACT OF THE DISCLOSURE

On a releasable backing or carrier is formed a film of the reaction product of an active hydrogen containing resin and a polyesterurethane prepolymer having free NCO groups (or a mixture of a hydroxyl polyester and excess polyisocyanate). To the film is then applied a layer of a foamable polyesterurethane. After the free surface of the foam becomes tacky, a flexible backing is applied with some pressure, and the composite is cured and stripped from the backing. To the film can also be applied a top coating. Alternatively, the film can be coated with an adhesive or cement and flocked. In a variant of the process, the foam is directly deposited on the releasable carrier, and after application of the fabric, curing and stripping, the free surface of the foam is treated with the adhesive and flocked. The active hydrogen containing resin can be a partially hydrolyzed vinyl chloride-vinyl acetate copolymer. Preferably, the film contains a major amount of the polyesterurethane; and the top coating contains a major amount of the active hydrogen containing resin and a minor amount of the polyesterurethane. The laminates so obtained are dry cleanable, have superior drape and scuff resistance, and are useful in making clothing.

---

This invention relates to flexible laminates, and, more particularly, it is related to dry-cleanable, leather-like fabric laminates having heat insulating properties, superior drape and superior scuff resistance and to processes for making the same.

Composite or laminated leather-like materials are generally considered to be of three classes, the soft vinyl coated fabric laminates, the urethane foam coated laminates and the slit urethane foam laminates, the latter being made by slitting a polyurethane foam and by adhering one of the slit portions to a fabric by means of a cement or by means of flame adhesion. Although outstanding in some aspects, the above classes are often deficient in one or more desirable properties.

One of the more notable failures of some of the aforementioned soft vinyl laminates has been the lack of drape qualities. Most of the vinyl laminates heretofore have been made of such a composition and construction as to fall short in matching the drape characteristics of cloth or suede leather thereby limiting the fashion versatility of the product. Another serious disadvantage of the anteriority is the inability of the laminate to withstand dry cleaning and machine washing because of plasticizer extraction and the resulting loss in flexibility. A further disadvantage is the loss of flexibility at low temperatures. Also, the usefulness of vinyl laminates is limited because of plasticizer being lost by migration, exudation or wipe off.

The second class of laminates, the urethane foam coated fabrics, have limited application in that in coating directly on a fabric the foam penetrates the fabric to give a stiff laminate. This is true even when using a high viscosity foam. In addition, the foams are relatively thick which again detracts from desirable drape qualities. Also, the foam has heretofore shown a nonuniform cell structure when attempts have been made to reduce the thickness.

The third class, the slit urethane laminates, have been undesirable due to the limits on thinness, as was found true of the urethane foam coated fabrics. When flame adhesion is used to melt the slit urethane foam to adhere it to the fabric, the large cell structure of the foam and the stiffness caused by melting resulted in a product of poor drape.

Accordingly, it is among the objects of this invention to provide a flexible laminate suitable for use in wearing apparel, upholstery and the like with good hand, low slip resistance, good scuff resistance and with superior drape characteristics.

Another object is to produce a foam laminate that will not become stiff during normal winter temperatures or because of loss of plasticizer.

Another object is to produce a method for making a leather-like laminate which is suitable for garments and which is resistant to dry cleaning, wet washing, scuffing and discoloration.

Yet another object resides in providing a substantially continuous process for making a fabric backed, generally leather-like material.

Still another object is to produce a water-proof, dry-cleanable coated fabric of improved wear resistance, drape and appearance and suitable for use in garments and characterized by having a polyurethane foamed inner layer for heat insulation that is strongly bonded both to a fabric backing and to a tough wear-resistant skin.

Other objects and advantages of the present invention will become more apparent from the following description of the invention and drawing in which:

FIGURE 1 is a diagrammatic elevational view of means for carrying out most of the steps of the present process in which, generally a polyurethane is coated on a release paper, gelled and then transfer laminated to the supporting fabric backing;

FIGURE 2 is a cross-sectional view on the line 2—2 of FIGURE 1 showing the component layers of the laminate prior to removal of the release paper;

FIGURE 3 is a diagrammatic elevational view of apparatus for continuing the process in which a top coat is applied to the skin coat of the laminate produced as a result of the process shown in FIGURE 1, and FIGURE 4 is a cross-sectional view on line 4—4 of FIGURE 3 showing the layers of the laminate.

SYNOPSIS OF THE INVENTION

We have discovered in accordance with the present invention that the objects are generally accomplished by forming on a carrier a flexible foam, structurally composed of three intermediate layers of varying density and thickness, one of which layers is bound to a flexible fabric. The foam is a polyurethane from which volatile gases have been allowed to escape so that more dense surface layers are formed with a less dense central portion. While the layers are still partially cured, non-flowable and tacky, a fabric is pressed onto the outermost dense surface of the foam. Often it will be considered desirable to bond another layer of plastic resinous material, hereinafter called the skin coat, to the foam layer opposite the fabric after removal of the carrier; and if necesary, to bond another layer, hereinafter called the top coat, to the skin layer.

GENERAL PROCESS DESCRIPTION

The process for the fabrication of the various layers is generally accomplished by forming on a suitable carrier the mentioned skin coat. The liquid, uncured skin coat comprises an NCO containing urethane prepolymer and active hydrogen containing extenders. By the term "active hydrogen" is meant those hydrogen atoms which are reactive as measured by the Zerewitinoff method and which includes the hydrogen atoms present in such radicals as the hydroxy and carboxyl radicals.

If the skin coat is not to be the uppermost layer, it will contain a major portion of urethane; however, if the skin coat is to be the wearing surface under circumstances such that it is desirable that the outer surface possess slip characteristics so that the laminate may be smoothly slid or slid upon with little surface drag, the uncured liquid skin coat is composed of a major amount of active hydrogen groups and a minor amount of urethane.

After the skin coat has been formed on the carrier, an insulating layer of polyurethane foam is formed thereon under conditions such that it has surface portions of higher density than the intermediate portion to provide interfaces of superior strength for adhesion to other layers of the laminate.

The polyurethane is applied to the skin coat as a foamable liquid and allowed to form and gel to form a flexible polyurethane foam of a thickness of approximately 0.025 inch. During the foaming process volatiles are permitted to escape by leaving the foaming material uncovered or exposed. In that manner a more dense upper layer is formed to provide superior adhesion to a fabric backing when it is applied. A more dense lower layer is also formed in contact with the skin coat which is in contact with the carrier.

When the polyurethane foam has reached the non-flowable but still tacky state, a suitable reinforcing fabric is applied in contact with the more dense upper layer so that adhesion occurs between the surface of the fabric and the foamed polyurethane. Thus, the polyurethane does not penetrate the fabric, i.e., there is little or no strike through.

The composite thus formed is allowed to cure preferably with the aid of suitable heating means which may be hot air, conduction heating, infra red, dielectric heating or the like. The carrier is thereupon separated from the composite, and the surface of the composite formerly in contact with the carrier or support is coated with a suitable top coat adapted to increase ease of slip or decrease sliding frictional resistance against the surface. This liquid top coat may be defined as a chain polymer containing a major portion of hydrogen containing extender and a minor amount of urethane-forming material containing isocyanato groups.

DETAILED DESCRIPTION OF PROCESS

Referring now more particularly to the drawing wherein like parts are designated throughout the several views by like numerals of reference, a suitable non-porous carrier is withdrawn from the roll 2 in the direction of the arrow 3 passing over the roller 4 and under the spray nozzle 5 which is connected to a source (not shown) of a skin coating material such as described in the subsequent Example II. The strip of backing 11 with the coating thereon is thereupon passed into the heating chamber 13. The movement of the upport 11 in the direction of the arrow 3 is at such a rate that the material applied as spray 12 dries or solidifies to a film which becomes a skin coat 6 before the support with the skin coat thereon passes under the applicator 7. The applicator 7 is connected to a suitable source of liquid foamable polyurethane. A thin liquid layer 8 is applied from the applicator 7 to the exposed surface 9 of the skin coat 6. The composite strip comprising the support 11, the skin coat 6 and the foamable layer 8 is passed through a suitable heating chamber 14 to accelerate the foaming reaction and form a polyurethane foam.

During the reaction in the heating chamber 14 the constituents of the foamable composition react and gas is produced both because of an isocyanate-water reaction and because of the vaporization of the volatile liquid such as the fluorinated alkanes subsequently described. The upper surface of the foamable liquid 8, being exposed, loses a substantial proportion of the gas therefrom with the result that an upper, relatively more dense, slightly porous layer 15 is formed to provide increased strength for attachment to the fabric backing. A collapse of gas bubbles or a movement thereof also occurs in the area adjacent to the lower surface of the foamed layer so that the surface 9 of the skin coat 6 has increased area of contact with the foam layer. Liquid layer 8 applied to the layer 6 thus becomes a foam layer that consists of (a) an intermediate layer 16 of good porosity, (b) an upper, more dense relatively non-porous layer 15 and (c) a lower layer 17 which is of intermediate density and thickness.

The length of time or dwell in the heating chamber 14 and the temperature of the chamber 14 is such that the polyurethane is still tacky when it reaches the area beneath the pressure roller 20.

The degree of gelation of the foam at the time of application of the fabric is critical in producing a satisfactory product. Too early application of the fabric results in excessive wetting of the fabric by the coating mix and a laminate with very poor drape. Lamination when gelation has proceeded beyond the optimum point, does not give a sufficiently strong bond. Lamination at the optimum point also permits calendering of the foam to a uniform thickness. The optimum point has been determined experimentally as the point where stringing initially occurs when the foam is contacted with a pencil point and the pencil point withdrawn.

A suitable fabric 21 is withdrawn from the roll 22 and passed under the pressure roll 20 so that it is pressed lightly against the tacky upper surface of the more dense layer 15. The material is then passed through the heated chamber 25. After passing through the chamber 25 where the composite has been fully cured, the support 11 is stripped from the composite 30 comprising (a) the skin coat 6, (b) the foam coat which itself consists of the layers 15, 16 and 17 and (c) the fabric 21. The composite 30 is thereupon wound up to form the roll 31. The roll 31 is thereupon transferred to the apparatus referred to in FIGURE 3 where it is unwound in the direction of the arrow, passed over the roller 32 and is roller coated or suitably coated with the top coat such as that subsequently described. The top coating material 33 is maintained in the trough 34 and is applied through the rollers 35, 36 and 37 to the exposed surface 38 of the composite 30. The laminated material thereupon passes through suitable driers 39a and 39b at a speed sufficient to cause the evaporation of all the solvent and the formation of the final article. The final material suitable for manufacture of wearing apparel and for other various and sundry uses is wound upon the roll 40. The material has the slip or low friction top coating 41 integrally connected with the skin coating 6 which in turn is chemically and integrally attached to one of the denser portions 17 of the foamed urethane which is firmly attached to the fabric backing 21 through the relatively strong and tear-resistant dense portion 15. The fabric 21 is preferably a knit fabric having a substantial elongation in both the warp and weft directions.

DESCRIPTION OF COMPONENTS

The carrier

Turning more now to the particulars of the invention, the carrier may be any transporting vehicle to which polyurethanes will not adhere, such as a non-porous release paper, a large glass or metal drum or a stainless steel belt. The non-porous release paper has proved most acceptable, especially when in the form of paper coated with a suitable release film as, for example, a silicone finish or a perfluoronated solid hydrocarbon such as polytetrafluoroethylene.

The skin coat

The skin coating composition comprises a polyurethane and an active hydrogen containing polymer. The polyurethane-forming material may be prepared by reacting, either by the one-shot method or in the form of a prepolymer a polyisocyanate having two isocyanato groups with a hereinafter described polyester of high molecular weight (2000-3000 M.W.) having preferably two hydroxyl groups. The term "polyhydric" includes both carboxyl OH groups as well as alcoholic OH groups.

Typical examples of suitable polyisocyanates are hexamethylene diisocyanate, hydrogenated methylene bis phenylene diisocyanate, butylene-1,4-diisocyanate, 2-methylbutane-1,4-diisocyanate and cyclohexylene diisocyanate.

The above enumerated isocyanates are aliphatic in order to provide color stability. It is recognized that many colors will not require the same degree of stability and will permit use of aromatic isocyanates such as 80/20 toluene diisocyanate, m-phenylene diisocyanate, methylene 4-4' bis phenylene diisocyanate, p-phenylene diisocyanate, and benzene triisocyanate. As the nonaromatic isocyanates are more expensive and less available than the more commonly used aromatic diisocyanates, it is desirable to use the more common aromatic diisocyanates which give better physical properties in the foam layer and protect the foam from exposure to light by making the skin and top coats opaque.

Urethane-forming material has been prepared by employing as the polyhydric compound, polyhydric polyesters, various glycols with 4 or more chain atoms separating the hydroxyl groups, polyols and various other polyhydric alcohols. The polyethers are usually alkylene ether glycols, as polypropylene ether glycol or polyisopropylene ether glycol, or triols, as glycerol or 1,3,6-hexane triol. The polyhydric polyesters are usually obtained by the reaction of a di- or tri-carboxylic acid, with a hydrocarbon polyol.

The di- or tri-carboxylic acids used to react to form the polyesters may include adipic, sebacic, trimetallitic or trimesitanic acid, etc.

The polyols used to react to form the polyesters include diols such as glycols, diglycols, polyoxyethylene glycol, as for example ethylene glycol, cyclohexanediol, 1,4-butanediol, and dipropylene glycol etc. having 2-6 carbon atoms in a chain between OH groups.

The mentioned urethane may be cross-linked with a wide variety of active hydrogen extenders reactive with isocyanates as is known from the prior art. The use of a vinyl resin copolymer containing functional groups reactive with isocyanates has been specific in obtaining adequate surface slip as described earlier. As this is a surface characteristic, it is required only in the coating which will be the wearing surface. A partially hydrolyzed vinyl chloride-vinyl acetate copolymer (VAGH) has been used to achieve the desired results. In addition, a vinyl copolymer containing 86% vinyl chloride, 13% vinyl acetate and 1% maleic acid (0.7% carboxyl content) has been used with equivalent results or copolymers of vinyl chloride and beta hydroxyl ethyl acrylate, or copolymers of vinyl chloride, methyl methacrylate, and beta hydroxypropyl-acrylate have been used. Also a cellulose monomer as cellulose acetate butyrate of the general formula $(C_{12}H_{14}O_4(R)_x(R')_y)_z$ where R represents $OCOCH_3$ or OH, R' represents $OCOC_3H_7$ or OH, $x$ represents any number from 1 to 5, $y$ represents any number from 1 to 5 and $z$ represents any number greater than 3 has been useful in providing the necessary active hydrogen to react with the isocyanate groups and give the required bonding and surface slip.

A ratio of 2:1, NCO equivalence to OH equivalence is desirable. Higher ratios improve the surface slip and hydrolytic stability of the skin but adversely affect the drape. Lower ratios have a reverse effect.

Dibutyltindilaurate has been the most effective catalyst evaluated in promoting the curing of the skin coat. Stannous octoate has given equivalent results with longer curing cycles. Use of N,N,N'N'-tetramethyl-butane diamine has given cure rates equivalent to stannous octoate but has resulted in brownish or purplish colors developing in the skin during cure. Lead naphthenate is another catalyst that may be used.

A wide range of colors can be made by pigmentation of the skin coat using pigments and techniques well known in the prior art. A pigment level of 25% of the total skin weight has been found to be the minimum level required to prevent discoloration. Equivalent results have been obtained when the pigment was all rutile titanium dioxide as well as with a rutile titanium dioxide-calcium carbonate mixture.

The weight of the skin required is influenced by the drape and scuff resistance required in the product. Increasing the weight of the skin reduces the drape and increases the scuff resistance. Samples have been made with skin coat weights from 0.75 to 3.0 ounces per square yard with corresponding shifts in the balance of drape and scuff resistance.

The foam coat

The foam coat may be formed from conventional materials comprising (a) a polyester which is formed by reacting a hydrocarbon polyol with a di- or tri-carboxylic acid, (b) an excess of isocyanate, (c) a suitable catalyst and (d) generally, a small amount of water which is preferably 0.02 to 0.1 percent of the composition. Also, superior drape properties are obtained when a major portion of the foaming is accomplished by solvent blowing of a suitable halogenated hydrocarbon as described in Patent No. 3,072,582 of Charles Frost, which patent is incorporated herein and made a part hereof by reference.

The said polyester may be polyesters of ethylene glycol, trimethylol propane, propylene glycol, 1-4 butanediol, and a di- or tri-carboxylic acid having 4 linear carbon atoms between carboxyl groups, such as adipic, sebacic, phthalic and trimellitic acid. Preferred materials to react with the di- or tri-carboxylic acid to form a polyester are glycols with two or more directly connected chain carbon atoms separating the hydroxyl groups. These yield high elastic flexible films which are color stable and resistant to dry cleaning solvents and hydrolysis. The use of a polyester based on a di- or tri-carboxylic acid such as adipic acid is preferred to obtain maximum resistance to dry cleaning. It is desirable that the polyester have ester groups

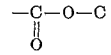

separated by an average of less than 12 carbon atoms to hold swellability in dry cleaning solvents to a more acceptable level. The molecular weights of linear chains separating OH groups in glycols, including polyglycols used in preparing the polyesters, should preferably be less than 200 when low swelling in dry cleaning solvents is desired.

If desired, polyethers having a molecular weight above 600 may be used in place of the polyesters, but are not nearly as resistant to swelling by dry cleaning solvents. The total MW of the urethanes whether prepared from a polyether or a polyester should not exceed 2500, and preferably is between 2000 and 2500.

Such polyhydric compounds are reacted with organic isocyanates which may be either aliphatic or aromatic. However, the aromatic diisocyanates are preferable for the foam coat since they are less expensive and more readily available.

Illustrative of suitable diisocyanates are the following: hexamethylene diisocyanate, toluene diisocyanate (TDI), 1,5-naphthylene diisocyanate, p-phenylene diisocyanate, m-phenylene diisocyanate, diphenylmethane-p,p'-diisocyanate (MDI), triphenyl-methane-p,p'-diisocyanate, tetramethylene diisocyanate, 4,4'-dicyclohexylmethane diisocyanate, xylene-4,4'-diisocyanate, cyclohexylene-1,2-diisocyanate, cyclohexylene-1,4-diisocyanate, 4,4'-diphenyl - diisocyanate, 3,3'-dimethoxy-4,4'-biphenylene diisocyanate, 4,4'-methylene di-o-tolyl-diisocyanate.

The catalyst type and level is important in obtaining sufficient expansion of the foam. The known organometallic urethane catalysts are preferred over the tertiary amine catalyst to obtain a more stable mix for coating. The amine catalyst tend to promote frothing of the mix from reaction of isocyanate with the water present in the resin before coating of the mix can be accomplished. Stannous octoate and lead naphthenate have also given desirable results.

The small amount of water, normally found in commercial resins, greatly increases gelation of the foam and facilitates efficient gas entrapment. As previously mentioned optimum results have been obtained with foams containing 0.02–0.1 percent water. Higher water contents give compositions which start forming before the mix can be coated, resulting in nonuniform foam density and cell structure.

The NCO-OH equivalence ratio has been found to be very critical in controlling the gelation rate. The optimum equivalent ratio has varied with different commercial resins within the range of 1.15:1 to 1.24:1. Samples have been made over the range of 1.05:1 to 1.40:1 with foams at either end of this range being more tacky and less elastic.

For the foam layer, urethanes expanded by a volatile solvent have given superior drape over other systems evaluated. This system has also been more readily coated and laminated to the fabric backing. It is preferred to limit the amount of diisocyanate to that consistent with forming a urethane of required flexibility and to provide blowing with compatible volatile liquids instead of with $CO_2$ from the isocyanate. Fluorinated, or fluorinated and chloronated hydrocarbons boiling below 150° F. are the preferred compatible blowing agents, and of these trichloromonofluoromethane is usually used. Other volatile liquid blowing agents are benzene, toluene, and hexane. However, the cell or cell control obtained with hydrocarbons is less desirable because of their compatibility with the urethane forming liquid. The cell structure after such expansion should not exceed 15 mils.

Some crosslinking agents such as trimethylol propane and glycerol may be present in the mixture to increase the rate of crosslinking and more efciently trap the volatile blowing agent.

To promote formation of fine cell structure an ionic methoxy capped copolymer of dimethyl polysiloxane and polyethylene oxide as a foam stabilizer has yielded a better quality foam over that previously obtained with a nonionic surfactant, such as nonyl-phenoxy poly-(ethyleneoxy) ethanol, or a surfactant as methoxy capped copolymers of dimethylpolysiloxane and block copolymers of polyethylene oxide and polypropylene oxide. The maximum cell size with the preferred surfactant is 10 mils as opposed to a maximum cell size of 15–20 mils with the nonionic surfactant. In both cases the average cell size was 3–5 mils. The cell structure in any event should not exceed the aforementioned 15 mil limit. In addition, the finished product must have at least 50% open cells.

A number of other nonionic surfactants and organosilicone polymers have been used to control cell size and such may be used as part of or in place of the above stabilizers. The foamable composition may contain other additives known to the art, such as pigments, fillers, plasticizers and hydrolytic stabilizers.

The fabric

The fabric applied may be any stretchable fabric. Rayon, felt, canvas, cotton or a high strength synthetic fiber as nylon or Dacron are examples of fabric that may be used. Experiments have shown that a 4.5 ounces per square yard cotton knit fabric having elongation of about 100% in one direction and elongation of about 67% in the direction at right angles thereto has proved very satisfactory.

The top coat

The top coat aforementioned is a major amount of an active hydrogen chain extender, as cellulose acetate butyrate, of the general formula $(C_{12}H_{14}O_4(R)_x(R')_y)_z$ where R represents $OCOCH_3$ or OH, R' represents $OCOC_3H_7$ or OH, $x$ represents any number from 1 to 5, $y$ represents any number from 1 to 5 and $z$ represents any number greater than 3 and a minor amount of urethane-forming material described below; or the active hydrogen chain extender of the top coat may be a partially hydrolyzed vinyl chloride/vinyl acetate copolymer; or the top coat may be a vinyl chloride/vinyl acetate copolymer containing 86% vinyl chloride, 13% vinyl acetate and 1% maleic acid (0.7% carboxyl content) reacted with a minor amount of urethane-forming material prepared by reacting a polyisocyanate having 2 to 3 isocyanate groups with a hereinafter described polyhydric compound of high molecular weight having preferably 2 to 3 terminal hydroxyl groups; or the top coat may be a copolymer of vinyl chloride/beta hydroxy ethyl acrylate or a copolymer of vinyl chloride/methyl methacrylate and beta hydroxy propyl acrylate, reacted with a minor amount of urethane-forming material.

The polyisocyanates acceptable for use to react with the polyhydric compounds are the aliphatic polyisocyanates. Illustrative of such isocyanates are the following: hexamethylene diisocyanate, and tetramethylene-diisocyanate, butylene-1,4-diisocyanate, 2-methyl-butane-1,4-diisocyanate. It is essential that the isocyanate used in the top coat be aliphatic in order to provide color stability.

Polyhydric compounds are used to react with the polyisocyanate to produce the urethane-forming material. Of the many polyhydric compounds, the polyesters, the polyethers above 600 M.W., glycols, triols and polyols are the most useful.

A polyester may be derived from the reaction product of a di- or tri-carboxylic acid such as adipic acid, and a polyhydric compound, such as ethylene glycol. Other polyesters known in the art may be used in the same manner.

Typical examples of glycols that may be used are 1,4-butane diol, 1,3-butane diol, 2,3-butane diol, 1,6-hexane diol, 1,3-propylene glycol, 1,2-propylene glycol. Preferred materials are glycols with 4 or more chain atoms separating the hydroxyl groups. These yield highly elastic, flexible films which are color stable and resistant to dry cleaning solvents.

The most effective catalyst evaluated in promoting the curing of the top coat has been found to be an organic metallic catalyst, such as dibutyl tin dilaurate. Using pigments and techniques well known in the art a wide range of colors can be obtained in this coat. Also various other fillers have been used. After drying the top coat weight was 0.5 gram per square yard.

The top coat may be made either by a one-shot method or by a prepolymer.

Flocking

Following the application of the foam coat or the top coat whichever is to be the one farthest from the fabric, the said uppermost coat may be flocked by any one of the known methods. One such method is to apply a cement, either synthetic or natural rubber based, to the cured, outermost foam coat. Thereafter the laminate with its surface coated with cement is advanced over vibrating means while flock or suede-forming material, such as short fibers of wool, cotton, nylon, etc., are sifted, shaken, sprinkled or blown on the cement coated surface. The amount of suede-forming material applied to the surface should be sufficient to completely cover the surface. The size of the flock should be such that about 90% of the particles pass through a 100 mesh screen of the Tyler series. The flocked laminate is passed through a final curing chamber where the cement with particles of flock embedded in it is completely dried. The finished product is a soft, pliable foam laminate. The suede-like appearance and feel is comparable to the appearance and feel of the best grades of suede leather. Also, because the flocking is applied to the urethane foam laminated layers the abrasive resistance is much better than natural suede. Moreover, the flocked laminate may readily be dry cleaned, as well as cleaned with a more conventional cleaner, as soap, detergents, etc.

The following examples illustrate the preparation of suitable mixtures for formation of the various layers on the carrier or release paper from which the resulting layer or layers may be stripped.

EXAMPLE I

The foam coat may be prepared by mixing:

100 grams of a polyester resin made from propylene glycol, ethylene glycol, trimethylol propane and adipic acid to give an OH number of 52.5, acid number of 1.44 and water content of 0.02 percent, 0.5 gram of a methoxy capped copolymer of dimethylpolysiloxane and polyethylene oxide surfactant, 0.25 gram of stannous octoate, 0.10 gram lead naphthenate, 5.0 grams of trichlorofluoromethane, and 9.0 grams of 80/20 toluene diisocyanate.

The first five ingredients were thoroughly mixed by a propeller type mixer, the diisocyanate added and intensely mixed for 30 seconds with the propeller type mixer. The mix thus prepared was immediately superimposed at a thickness of 0.018 inch on the carrier or support. The mix and support were placed in a 250° F. circulating air oven for 10 minutes at which time the coating had foamed to approximately 0.025 inch thickness and had gelled to a firm but highly tacky state. Foam weight was 7.3 ounces per square yard.

To this layer was applied a fabric as illustrated in FIGURE 1.

The following example illustrates the preparation of a suitable mixture for the skin coat.

EXAMPLE II

A prepolymer was made by reacting:

100 grams of a linear polyester prepared by reacting 60 percent of ethylene glycol and 40 percent of 1,4-butanediol with adipic acid to a hydroxyl number of 50.7 and an acid number of 1.64 with 16.9 grams of hexamethylene diisocyanate for one hour at 100° C. This prepolymer had an NCO content of 3.56 percent.

A solution of a hydroxyl containing vinyl resin was prepared by milling for 10 minutes at 88–93° C. on a two-roll rubber mill blend of:

500 grams of partially hydrolyzed vinyl chloride/vinyl acetate copolymer containing 2.3 percent hydroxyl groups, 250 grams of rutile titanium dioxide, 250 grams of dry ground limestone, 20 grams of an epoxy resin vinyl stabilizer and 17 grams of a suitable cadmium-barium-zinc vinyl stabilizer.

The milled blend was cut into one inch squares and swollen in 1200 grams of methyl ethyl ketone and 300 grams of toluene overnight. Commercial solvents were predried by storing in contact with approximately 1% anhydrous calcium sulfate and decanting off the solvent before use. Solution of the milled blend was completed by mixing with a propeller type mixer for 23 hours.

The skin coating mix was prepared by mixing:

12.5 grams of the above prepolymer, 31.0 grams of the vinyl resin blend solution, 10.0 grams of dry methyl ethyl ketone, 0.05 gram of dibutyl tin dilaurate.

The above mix had a potlife of 34 hours after which a rapid viscosity rise and gelation occurred. The mix was applied to the support to a thickness of 0.008 inch. After drying in a 158° F. circulating air oven for five minutes to remove the solvent, the dry thickness was 0.0012 inch. Dry weight was 1.2 ounces per square yard. The curing temperature was 158° F. and the dwell within the heating chamber was 2½ minutes.

To the above skin coat was superimposed the foam coat which was cured at 158° F. for 2½ minutes formulated as in Example I and applied as illustrated in FIGURE 1 of the drawing.

The following example illustrates the formation of a top coat to be applied to the skin or foam coats.

EXAMPLE III

A top coat was prepared by rolling 100 grams of the vinyl resin blend solution of Example II with 6 grams of silica aerogel for 16 hours in a pint metal can half filled with one inch steel balls. Then grams of the above silica aerogel dispersion were mixed with 21 grams of the vinyl resin blend solution, 12.5 grams of the polyester resin hexamethylene diisocyanate prepolymer of Example II, 10 grams of dry methyl ethyl ketone and 0.05 gram of dibutyl tin dilaurate.

This was coated to a depth of 0.01 inch directly on the skin coat as illustrated in FIGURE 3 of the drawing. After drying five minutes at 158° F. and curing five minutes at 250° F., the top coat weight was 0.5 gram per square yard.

The foam and skin coats to which the top coat was applied were prepared as illustrated in Examples I and II. The resultant material had a thickness of about 0.040 inch and a weight of 13. 8 ounces per square yard.

The disclosure of our copending application entitled "Coated Fabric and Method for Making the Same," Serial No. 338,826, filed of even date herewith is incorporated herein by reference.

What we claim is:

1. A method of producing a fabric reinforced flexible plastic material having desirable drape and dry cleaning properties which comprises: forming a film on the releasable surface of a suitable solid support which film comprises a reaction product of a partially hydrolyzed copolymer of a major proportion of vinyl chloride and a minor proportion of vinyl acetate with a member of the group consisting of (a) mixtures of a polyester with excess polyisocyanate and (b) liquid prepolymers of polyesters with polyisocyanates which prepolymers have some isocyanate groups, superimposing on said film a thin layer of foamable liquid adapted to solidify to a polyester urethane foam, allowing said liquid to solidify and set up to a non-flowable foam with a tacky surface while permitting loss of volatile matter from the exposed surface thereof so as to form a more dense tough surface layer, superimposing with pressure a fabric backing layer on the tacky more dense surface of the said foam, curing the foam to the nontacky state, and stripping the composite of said foam and said backing layer and said film from said support.

2. A method of producing a fabric reinforced flexible plastic material having desirable drape and dry cleaning properties which comprises: forming a film on the releasable surface of a suitable solid support which film comprises a reaction product of a copolymer of vinyl chloride-vinyl acetate and a small amount of maleic acid with a member of the group consisting of (a) mixtures of a polyester with excess polyisocyanate and (b) liquid prepolymers of polyesters with polyisocyanates which prepolymers have some isocyanate groups, superimposing on said film a thin layer of foamable liquid adapted to solidify to a polyesterurethane foam which liquid comprises a fluorine containing alkane boiling below 150° F., allowing said liquid to solidify and set up to a nonflowable foam with a tacky surface while permitting loss of volatile matter from the exposed surface thereof so as to form a more dense tough surface layer, superimposing with pressure a fabric backing layer on the tacky more dense surface of the said foam, curing the foam to the non-tacky state, and stripping the composite of said foam and said backing layer and said film from said support.

3. A method of producing a fabric reinforced flexible plastic material having desirable drape and dry cleaning properties which comprises: forming a film on the releasable surface of a suitable solid support which film comprises the reaction product of a partially hydrolyzed copolymer of about 91 percent vinyl chloride and 9 percent vinyl acetate containing 2.3 percent —OH with a prepolymer of about 17 parts of hexamethylene diisocyanate and about 100 parts of a polyester made by co-reacting 60 percent ethylene glycol, 40 percent 1-4 butylene glycol with adipic acid to an —OH number of about 50.7 and an acid number of 1.64, superimposing on said film a thin layer of foamable liquid adapted to solidify to a polyester urethane foam which liquid comprises a mixture of trichloromonofluoromethane and of 100 parts by weight of a polyester, 9 parts by weight of toluene diisocyanate, a nonionic surfactant, stannous octoate and lead naphthenate, said polyester in said foamable liquid being a reaction product of ethylene glycol, propylene glycol, trimethylol propane and adipic acid and having an —OH number of 52.2 and an acid number of 1.44 and a water content of 0.02 percent, allowing said liquid to solidify and set up to a non-flowable foam with a tacky surface while permitting loss of volatile matter from the exposed surface thereof so as to form a more dense tough surface layer, superimposing with pressure a fabric backing layer on the tacky more dense surface of the said foam, curing the foam to the nontacky state, and stripping the composite of said foam and said backing layer and said film from said support.

4. A method of producing a fabric reinforced flexible plastic material having desirable drape and dry cleaning properties which comprises: forming a film on the releasable surface of a suitable solid carrier which film comprises the reaction product of a partially hydrolyzed vinyl halide-vinyl acetate copolymer with a polyesterurethane having free isocyanate groups, superimposing on said film a thin layer of foamable liquid adapted to solidify to a polyester urethane foam which liquid comprises a diisocyanate, and a hydroxyl terminated polyester having ester linkages

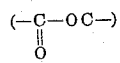

spaced by an average of less than 8 atoms in a linear chain, allowing said liquid to solidify and set up to a non-flowable foam with a tacky surface while permitting loss of volatile matter from the exposed surface thereof so as to form a more dense tough surface layer, superimposing with pressure a fabric backing layer on the tacky more dense surface of the said foam, curing the foam to the nontacky state, and stripping the composite of said foam and said backing layer and said film from said support.

5. A method of producing a fabric reinforced flexible plastic material having desirable drape and dry cleaning properties which comprises: forming a film on the releasable surface of a suitable solid carrier which film comprises the reaction product of a resinous material having active hydrogen atoms (as determined by the Zerewitinoff method) therein and being selected from the group consisting of a partially hydrolyzed vinyl chloride-vinyl acetate copolymer, a terpolymer of vinyl chloride, vinyl acetate and maleic acid, a copolymer of vinyl chloride and beta hydroxy ethyl acrylate, a terpolymer of vinyl chloride, methyl methacrylate and beta hydroxy propyl acrylate and cellulose acetate butyrate with a member selected from the group consisting of (a) a mixture of a polyester having at least two hydroxyl groups with excess polyisocyanate and (b) a liquid prepolymer of a polyester having at least two hydroxyl groups with a polyisocyanate which prepolymer has some isocyanato groups, superimposing on said film a thin layer of foamable liquid adapted to solidify a polyester urethane foam able liquid which comprises a blowing agent selected from the group consisting of a fluorinated hydrocarbon and a fluorinated and chlorinated hydrocarbon, allowing said liquid to solidify and set up to a non-flowable foam with a tacky surface while permitting loss of volatile matter from the exposed surface thereof so as to form a more dense tough surface layer, superimposing with pressure a fabric backing layer on the tacky more dense surface of the said foam, curing the foam to the nontacky state, and stripping the composite of said foam and said backing layer and said film from said support.

6. A dry-cleanable flexible laminate suitable for clothing and the like comprising: a stretchable fabric backing, a foamed polyesterurethane layer having relatively dense portions separated by an intermediate more porous less dense portion, a wear-resistant skin layer, which comprises a reaction product of a partially hydrolyzed copolymer of vinyl chloride and vinyl acetate with a liquid polyester modified polyisocyanate having —NCO groups, one of said more dense portions of said foamed polyurethane layer being attached to a surface of said fabric and another of said more dense portions being attached to said wear-resistant skin layer, and one face of said fabric being free of and unstiffened by polyurethane whereby the said skin and the said fabric backing are strongly bonded to said foam.

7. A dry-cleanable flexible laminate suitable for clothing and the like comprising: a stretchable fabric backing, a foamed polyesterurethane layer having relatively dense portions separated by an intermediate more porous less dense portion, a wear-resistant skin layer, which comprises a reaction product of a terpolymer of a major proportion of vinyl chloride, a minor proportion of vinyl acetate and a more minor proportion of maleic acid with a prepolymer of a liquid polyester and a polyisocyanate, one of said more dense portions of said foamed polyurethane layer being attached to a surface of said fabric and another of said more dense portions being chemically attached by reaction of isocyanate groups of said polyurethane with active hydrogen containing groups to said wear-resistant skin layer, and one face of said fabric being free of and unstiffened by polyurethane whereby the said skin and the said fabric backing are strongly bonded to said foam.

8. A method for producing a fabric reinforced flexible plastic material having desirable drape and dry cleaning properties which comprises: forming a film on the releasable surface of a suitable solid support which film comprises the reaction product of a partially hydrolyzed copolymer of about 91 percent vinyl chloride and 9 percent vinyl acetate containing 2.3 percent —OH with a prepolymer of about 17 parts of hexamethylene diisocyanate and about 100 parts of a polyester made by co-reacting 60 percent ethylene glycol and 40 percent 1-4 butylene glycol with adipic acid to an —OH number of about 50.7 and an acid number of 1.64, superimposing on said film a thin layer of foamable liquid adapted to solidify to a polyester urethane foam which liquid comprises a mixture of trichloromonofluoromethane and of 100 parts by weight of a polyester, 9 parts by weight of toluene diisocyanate, a nonionic surfactant, stannous octoate and lead naphthenate, said polyester in said foamable liquid being a reaction product of ethylene glycol, propylene glycol, trimethylol propane and adipic acid and having an —OH number of 52.2 and an acid number of 1.44 and a water content of 0.02 percent, allowing said liquid to solidify and set up to a non-flowable foam with a tacky surface while permitting loss of volatile matter from the exposed surface thereof so as to form a more dense tough surface layer, superimposing with pressure a fabric backing layer on the tacky more dense surface of the said foam, curing the foam to the nontacky state, and stripping the composite of said foam and said backing layer and said film from said support, and applying a solidifiable film adhesive cement to the topmost polyurethane surface, depositing flock and permitting the said cement to form a solid film, whereby said flock becomes chemically bound to said foam.

9. A flexible laminate comprising a backing of fibrous material, a polyesterurethane foam layer in contact with said backing and having one face thereof adhered thereto, and a top coating of wear resistant suedelike material adhered to the opposite face of said foamed layer, said foamed layer having a more dense surface portion on opposite sides of an intermediate less dense portion, one of said more dense portions being attached to said fabric and the other of said more dense portions being attached to said suedelike coating, said suedelike coating comprising flock particles embedded in a layer of adhesive secured to said opposite face of said foamed layer, the interior and one face of said fabric backing being free of polyurethane, whereby said laminate has improved drape and scuff resistant properties.

10. A method of producing a fabric reinforced flexible suede leather-like plastic material having desirable drape and dry cleaning properties which comprises forming on the releasable surface of a suitable solid support a thin layer of foamable liquid adapted to solidify to a polyester urethane foam, which liquid comprises a fluorine containing alkane boiling below 150° F., allowing said liquid to solidify and set up to a non-flowable foam with a tacky surface while permitting loss of volatile matter from the exposed surface thereof so as to form a more dense tough surface layer, superimposing with pressure a fabric backing layer on the tacky more dense surface of the said foam to permit chemical interaction between —NCO groups of said surface and a face of said fabric, curing the foam to the nontacky state, stripping the composite comprising said foam and said backing layer from said support, applying a solidifiable liquid adhesive film over the surface of said composite that was formerly in contact with said solid support, applying a flock to the adhesive film and allowing said adhesive film to solidify.

11. The method for producing a fabric reinforced flexible plastic material having desirable drape and dry cleaning properties and a suedelike surface which comprises:

forming a film on the releasable surface of a suitable solid support which film comprises a reaction product of a resinous compound having active hydrogen atoms (as determined by the Zerewitinoff method) with a member of the group consisting of (a) mixtures of a polyester having at least two hydroxyl groups with excess polyisocyanate and (b) liquid prepolymers of polyesters having at least two hydroxyl groups with polyisocyanates which prepolymers have some isocyanato groups, superimposing on said film a thin layer of foamable liquid adapted to solidify to a polyester urethane foam, allowing said liquid to solidify and set up to a nonflowable foam with a tacky surface while permitting loss of volatile matter from the exposed surface thereof so as to form a more dense tough surface layer, superimposing with some pressure a fabric backing layer on the tacky more dense surface of the said foam, curing the foam to the nontacky state, stripping the composite of said foam and said backing layer and said film from said support, applying a solidifiable liquid adhesive film over the surface of said composite that was formerly in contact with said solid support, applying a flock to the adhesive film and allowing said film to solidify whereby said flock becomes bound to said composite.

12. A flexible laminate comprising a backing of fibrous material, a polyesterurethane foam layer in contact with said backing and having one face thereof adhered thereto, a polymeric layer adhered to the opposite face of said foam layer, said polymeric layer being the reaction product of a resinous compound having active hydrogen atoms (as determined by the Zerewitinoff method) with a member of the group consisting of (a) mixtures of a polyester having at least two hydroxyl groups with excess polyisocyanate and (b) liquid prepolymers of polyesters having at least two hydroxyl groups with polyisocyanates which prepolymers have some isocyanato groups, and a top coating of wear resistant suedelike material adhered to the free surface of said polymeric layer and also opposite from said foam layer, said suedelike coating comprising flock particles embedded in a layer of adhesive secured to the free surface of said polymeric layer and also opposite from said foam layer, said foam layer having a more dense surface portion on opposite sides of an intermediate less dense portion, one of said more dense portions being attached to said backing and the other of said more dense portions being attached to said polymeric layer, and the interior and one face of said backing being free of polyurethane, whereby said laminate has improved drape and scuff resistant properties.

13. The method for producing a fabric reinforced flexible plastic material having desirable drape and dry cleaning properties which comprises:

forming a film on the releasable surface of a suitable solid support which film comprises a reaction product of a minor amount of a resinous compound having active hydrogen atoms (as determined by the Zerewitinoff method) with a major amount of a member of the group consisting of (a) mixtures of a polyester having at least two hydroxyl groups with excess polyisocyanate and (b) liquid prepolymers of polyesters having at least two hydroxyl groups with polyisocyanates which prepolymers have some isocyanato groups, superimposing on said film a thin layer of foamable liquid adapted to solidify to a polyester urethane foam, allowing said liquid to solidify and set up to a nonflowable foam with a tacky surface while permitting loss of volatile matter from the exposed surface thereof so as to form a more dense tough surface layer, superimposing with some pressure a fabric backing layer on the tacky more dense surface of the said foam, curing the foam to the nontacky state, stripping the composite of said foam and said backing layer and said film from said support, and forming on the free surface of said film opposite said foam a coating comprising the reaction product of a major amount of a resinous compound having active hydrogen atoms (as determined by the Zerewitinoff method) with a minor amount of a member of the group consisting of (c) mixtures of a polyester having at least two hydroxyl groups with excess polyisocyanate and (d) liquid prepolymers of polyesters having at least two hydroxyl groups with polyisocyanates which prepolymers have some isocyanato groups.

14. The method according to claim 13 in which said resinous compound having active hydrogen atoms is selected from the group consisting of partially hydrolyzed vinyl chloride-vinyl acetate copolymer, a terpolymer of vinyl chloride, vinyl acetate, and maleic acid, a copolymer of vinyl chloride and beta hydroxy ethyl acrylate, a terpolymer of vinyl chloride, methyl methacrylate and beta hydroxy propyl acrylate, and cellulose acetate butyrate.

15. A flexible laminate having improved drape, slip and scuff resistant properties and resistance to dry cleaning which comprises a backing of flexible fibrous material, a polyesterurethane foam layer in contact with said backing and having one face thereof adhered thereto, a skin coating of wear resistant plastic material adhered to the opposite face of said foam layer, and
a top coating having slip characteristics adhered to the free surface of said skin coating and also opposite from said foam layer,
said skin coating comprising the reaction product of a minor amount of a resinous compound having active hydrogen atoms (as determined by the Zerewitinoff method) with a major amount of a member of the group consisting of (a) mixtures of a polyester having at least two hydroxyl groups with excess polyisocyanate and (b) liquid prepolymers of polyesters having at least two hydroxyl groups with polyisocyanates which prepolymers have some isocyanato groups,
said top coating comprising the reaction product of a major amount of a resinous compound having active hydrogen atoms (as determined by the Zerewitinoff method) with a minor amount of a member of the group consisting of (c) mixtures of a polyester having at least two hydroxyl groups with excess polyisocyanate and (d) liquid prepolymers of polyesters having at least two hydroxyl groups with polyisocyanates which prepolymers have some isocyanato groups, and said foamed layer having a more dense surface portion on opposite sides of an intermediate less dense portion, one of said more dense portions being attached to said backing, the other of said more dense portions being attached to said skin coating, and the interior and one face of said backing being free of polyurethane.

16. A flexible laminate according to claim 15 in which said resinous compound having active hydrogen atoms is selected from the group consisting of partially hydrolyzed vinyl chloride-vinyl acetate copolymer, a terpolymer of vinyl chloride, vinyl acetate and maleic acid, a copolymer of vinyl chloride and beta hydroxy ethyl acrylate, a terpolymer of vinyl chloride, methyl methacrylate and beta hydroxy propyl acrylate, and cellulose acetate butyrate.

References Cited
UNITED STATES PATENTS
2,981,637    4/1961    Spencer et al.    117—76
3,061,475    10/1962    Wallace    156—78 X
3,233,576    2/1966    Voelker    156—78 X ALEXANDER WYMAN, *Primary Examiner.*

M. A. LITMAN, *Assistant Examiner.*